United States Patent Office 2,805,972
Patented Sept. 10, 1957

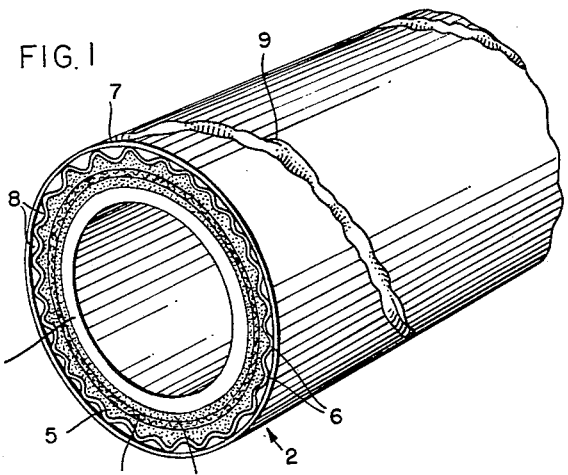
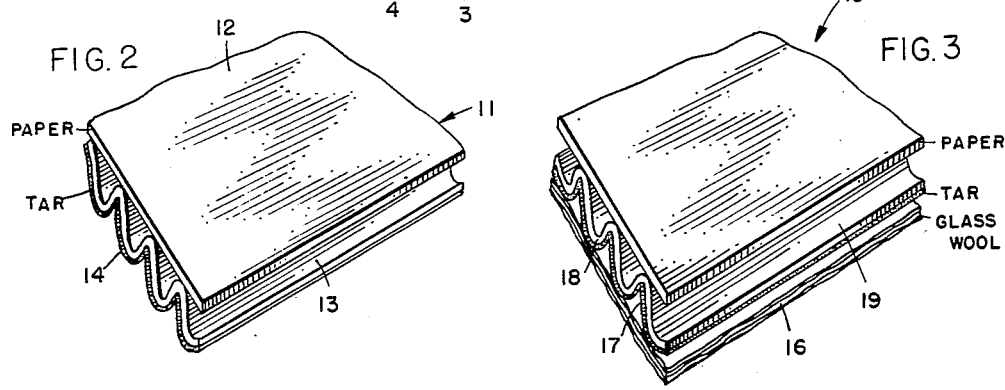

2,805,972

PIPE LINES AND SHEATHING MATERIAL THEREFOR

Walter M. Cross, Jr., and Forbes Cross, Kansas City, Mo., assignors to Kansas City Testing Laboratory, Kansas City, Mo., a corporation of Missouri Application July 17, 1950, Serial No. 174,166

4 Claims. (Cl. 154—45)

This invention relates in general to the protection of pipe lines and to pipe lines covered with a corrosion-resistant sheathing. More particularly, the invention relates to a sheathing material for application to metal pipe lines to prevent corrosion and wear on the pipe.

The advantages of applying a corrosion-resisting jacket to pipe lines are well-known in the art. The more advanced practice is to apply a coating of tarry material followed by a wrapping of paper and to overcoat with another layer of tarry material. It is quite important, however, that the entire surface of the pipe line be insulated from contact with the earth because corrosion can occur through the slightest cut or tear in the jacket. In the art of laying pipe lines, it is recognized today that a pipe jacket will very likely be cut or torn during the process of placing it in the earth. Such cutting and tearing is caused by contact with the mechanical tools employed in laying pipe lines, but is principally caused by contact with rock and stones in the earth. In laying pipe line through rocky terrain it is common practice today to line the trench with a layer of sand before placing the pipe line therein in order to prevent the cutting and tearing of the jacket during the laying process.

It is an object of this invention to provide a pipe line which is protected against corrosion and wear.

Another object of the invention is to provide a pipe line having a jacket that will not be torn or cut by the mechanical laying equipment or by contact with rocky terrain.

Another object of the invention is to provide a sheathing for pipe lines which is inexpensive to make and apply and which will provide satisfactory protection against corrosion and wear for a long period of time.

A further object is to provide a sheathing for pipe lines which will resist the cutting and tearing action of mechanical equipment and rocky terrain.

Still another object is to provide a method for protecting pipe lines with a sheathing which will be resistant to impact, cutting and tearing.

These and other objects and advantages of the invention will become more apparent upon a consideration of the following specification in view of the drawings in which:

Figure 1 is a perspective view of a section of a pipe made according to the invention;

Figure 2 is a perspective view with a part broken away of one type of sheathing material prepared according to the invention;

Figure 3 is a perspective view with a part broken away of another embodiment of the sheathing material; and Figure 4 is a perspective view with a part broken away of still another embodiment of the sheathing material.

Stated generally, the invention provides a pipe line adapted to be buried in or laid on the earth which has wrapped about it a jacket or corrugated paper, and between the paper and the pipe a layer of plastic bituminous tar material. Another embodiment of the invention contemplates the preparation of a sheathing material comprising a layer of corrugated paper, a layer of tar material partially or wholly filling the flutes of the corrugated paper and a layer of glass wool (intermeshed glass fibers) over said tar material. This material is applied to a pipe while still warm and plastic and upon cooling, forms a corrosion and wear-resistant sheathing about said pipe which is exceptionally resistant to shock, impact, cutting and tearing.

Sheathing materials in which the flutes of corrugated paper are coated or filled with tarry material as described herein have been found to have exceptional qualities as a shock or impact resisting jacket material for pipe lines. This is unusual in view of the well-known fact that ordinary paper is unsatisfactory because it is subject to tearing and cutting caused by the mechanical laying equipment and by the rocks in the soil. The exceptional utility of the corrugated material of the present invention is readily proven by subjecting a jacket made from such paper to the tests which are ordinarily employed in determining the shock or impact resistance of a pipe line coating.

The "Jeep" test is the standard test for determining if there has been a break in the coating on a pipe line. According to this test, the pipe is made one pole of an electrical system. A current of high voltage electricity (4,000 to 18,000 volts) is applied to the outside of the coat. If a break or cut is present in the coating, the high voltage current will spark to the pipe and will thereby show the existence of the flaw in the coating. This test is used both in the field and in the laboratory.

Pipe lines coated with sheathing material made according to the practice of this invention have been tested for shock or impact resistance by the ball test. In this test a heavy steel ball is dropped onto the coated pipe from a predetermined height. The "Jeep" test is then run to determine if any breaks in the coating have occurred. The sheathing material of this invention has proven very shock-resistant as measured by the above standard tests. In these tests and in actual use, the sheathing has proven to have a resistance to shock, impact, cuts and tears that is many times better than the resistance of heretofore known coatings.

Without intending to limit the invention in any way, we will describe certain embodiments of it with reference to the accompanying drawings. In Figure 1 a metal pipe 1 is illustrated as having a sheathing 2 wound about it to form a water-proof and wear-resistant jacket. The sheathing 2 consists of a base coating 3 of tarry material applied to the pipe 1. A layer of glass wool 4 is placed over the base coating 3. A top layer 5 of tarry material is placed over the glass wool 4 and extends into the flutes 6 of a layer of single face corrugated paper 7. It will be noted that there are air spaces 8 in the corrugated paper 7 between the flutes 6 and the surface of the corrugated paper. A slight excess of tarry material is visible at 9 where it has exuded between the flutes of the corrugated paper 7.

The jacket illustrated in Figure 1 is shown in greater detail in Figure 4 in which the sheathing 2 is made up of a base coating of tar 3, a layer of glass wool 4, and a top layer of tarry material 5 which either partially or wholly fills in the flutes 6 of the corrugated paper 7. In Figure 4 an additional outer layer 10 of tarry material is applied over the flat surface of the corrugated paper 7. The outer layer 10 will ordinarily be exposed to the elements or to the soil and has been added principally to provide a water-proof coating for the paper 7. This embodiment of the sheathing material represents the preferred practice of the invention, but it likewise is the most expensive type of sheathing material contemplated by the invention. Even so, this embodiment is relatively inexpensive as compared to the present practice of applying protective coatings to pipe lines. Substantial savings in labor are possible because this sheathing material can be fabricated at a central plant and applied at the job site by a single operation of the ordinary wrapping equipment.

Excellent results have also been obtained by applying a sheathing of the material illustrated in Figure 2 which represents a very simple embodiment of the invention. In Figure 2 there is shown a piece of single face corrugated paper 11 which is composed of a flat base sheet or liner 12 and an undulated sheet 13. The practice of making such paper is so well-known as not to require description in this invention. A layer of tarry material 14 is illustrated to be partially or wholly filling the exposed flutes formed by the undulated layer 13. This type of sheathing can be very readily manufactured at low cost and yet will provide exceptional resistance to shock, impact, tearing and cutting when subjected to handling in mechanical pipe laying equipment, or when placed in rocky terrain.

Figure 3 illustrates still another embodiment of the invention in which the sheathing material 15 is composed of a layer of glass wool 16 upon which is placed a layer of tar 17 which partially or completely fills the flutes 18 of a sheet of corrugated paper 19 and bonds the paper and glass together. This embodiment of the sheathing material is adapted to fabrication at a centralized point followed by application to the pipe in the field. In practice this type of sheathing is applied to the pipe by coating the pipe with a layer of molten or tacky tarry material and then wrapping the pipe with the sheathing material while the tar is still tacky. The tar infilters between the fibers of the glass wool and forms a very strong bond between the sheathing material and the tar on the surface of the pipe.

As stated before, the art of manufacturing corrugated paper is so well-known as to need no elaboration. The invention contemplates the use of any of the standard grades of corrugated paper. While the examples show single face corrugated paper, it will be understood that double face paper may be used with good results. Likewise the glass wool employed herein is the standard product known in the commercial market today.

If desired, the successive layers of materials, or some of them, may be applied to the pipe at the pipe manufacturing plant.

The plastic bituminous tar material which is referred to in this invention may be either a coal tar or an asphaltic compound derived from certain types of petroleum. One preferred type of tar is characterized as being made up of long chain petroleum hydrocarbons. This tar has excellent plasticity and resistance characteristics and is especially useful because it has a high melting point, high penetration point and a dry surface. One type of asphaltic polymer which is particularly suitable is prepared by mixing 85% of straight run, uncracked Iola Kansas residual oil with 15% Iola cracked residual oil. This mixture is air blown until it develops the required melt point and penetration point. These characteristics give the coating good resistance to flow due to overburden and applied pressure, and at the same time they afford the best resistance to cracking and chipping at low temperatures. The same features are accompanied by strong cohesiveness to the pipe. A material of this type which has been found to be especially suitable has a melting point (Ball and Ring) between 230° F. and 335° F. and a penetration (ASTM) between 22 and 46 at 70° F.

We wish it understood that the invention is not limited to any particular type of tarry material or corrugated paper board. Numerous adaptations of the invention may be made by those familiar with the art of coating metals without departing from the spirit of the invention.

For example, it may be desirable in some instances to waterproof a kraft-type corrugated paper on its smooth or outer surface before applying tarry material in or on the flutes. Again it may be desirable to make the corrugated sheet entirely or partially of mineral fibers such as asbestos or of plastic fibers such as nylon. Such sheets would be more resistant to decomposition upon contact with the earth.

From the foregoing disclosure it will be apparent that the present invention provides a pipe line which is exceptionally resistant to wear and corrosion by virtue of a sheathing which is many times more resistant to shock, impact, tearing and cutting than any of the heretofore known pipe line coating materials.

The invention is hereby claimed as follows:

1. A pipe line laid in contact with the soil and comprising metal pipe, a sheet of corrugated paper surrounding said pipe, a sheet of flat paper on the outer surface of said sheet of corrugated paper and surrounding it, and a layer of tarry material between said pipe and said sheet of corrugated paper substantially completely covering the inner surface of the latter, said tarry material being normally solid and melting to a plastic state when heated.

2. A pipe line laid in contact with the soil and comprising metal pipe, a sheet of corrugated paper surrounding said pipe, a sheet of flat paper on the outer surface of said sheet of corrugated paper and surrounding it, a layer of tarry material between said pipe and said sheet of corrugated paper substantially completely covering the inner surface of the latter, said tarry material being normally solid and melting to a plastic state when heated, and a layer of glass wool between said pipe and said layer of tarry material and surrounding the pipe.

3. A pipe line sheathing material consisting essentially of a sheet of corrugated paper, a coextensive sheet of flat paper on one surface of said sheet of corrugated paper, a layer of tarry material substantially completely covering the other surface of said sheet of corrugated paper, said tarry material being normally solid and melting to a plastic state when heated, and a coextensive layer of glass wool on the outer surface of said layer of tarry material, said sheathing material being adapted to be wrapped around a pipe.

4. In laying a pipe line in the earth, the improvement which comprises first protecting the pipe by covering the pipe with a layer of tarry material, a sheet of corrugated paper and a sheet of flat paper, said layer of tarry material lying between said pipe and said sheet of corrugated paper, said layer of tarry material also substantially completely covering the inner surface of and substantially completely filling the flutes on the inner surface of said sheet of corrugated paper, said tarry material being normally solid and melting to a plastic state when heated, said sheet of flat paper lying on the outer surface of said sheet of corrugated paper.

References Cited in the file of this patent

UNITED STATES PATENTS

| | | |
|---|---|---|
| 488,248 | Norris | Dec. 20, 1892 |
| 732,299 | Holden | June 30, 1903 |
| 1,020,567 | Moeller | Mar. 19, 1912 |
| 1,592,824 | Fairchild | July 20, 1926 |
| 1,913,180 | Weber | June 6, 1933 |
| 1,929,817 | Helsing | Oct. 10, 1933 |
| 1,948,007 | Putnam | Feb. 20, 1934 |
| 2,081,872 | Kahn et al. | May 25, 1937 |
| 2,261,730 | Mitman | Nov. 4, 1941 |
| 2,311,573 | Shoan | Feb. 16, 1943 |
| 2,330,966 | Gottwald et al. | Oct. 5, 1943 |
| 2,405,527 | Skolnik | Aug. 6, 1946 |
| 2,532,587 | Williamson | Dec. 5, 1950 |